(12) United States Patent
Ha

(10) Patent No.: US 9,025,788 B2
(45) Date of Patent: May 5, 2015

(54) EARPHONE SYSTEM FOR MOBILE DEVICE AND METHOD FOR OPERATING THE SAME

(75) Inventor: Jung Su Ha, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 368 days.

(21) Appl. No.: 13/091,486

(22) Filed: Apr. 21, 2011

(65) Prior Publication Data

US 2011/0268291 A1 Nov. 3, 2011

(30) Foreign Application Priority Data

Apr. 30, 2010 (KR) .................. 10-2010-0041046

(51) Int. Cl.
 *H04R 3/02* (2006.01)
 *H04R 5/04* (2006.01)
 *H04R 1/10* (2006.01)
 *G10K 11/16* (2006.01)

(52) U.S. Cl.
 CPC ............... *H04R 5/04* (2013.01); *H04R 1/1041* (2013.01); *H04R 2420/05* (2013.01)

(58) Field of Classification Search
 USPC .................... 381/123, 74, 26, 81, 58; 700/94; 455/575.2, 575.6
 See application file for complete search history.

(56) References Cited

U.S. PATENT DOCUMENTS

| 6,970,752 | B1* | 11/2005 | Lim et al. ................ 700/94 |
| 7,248,707 | B2* | 7/2007 | Peng et al. .............. 381/74 |
| 2003/0139204 | A1 | 7/2003 | Lim |
| 2005/0201568 | A1* | 9/2005 | Goyal ..................... 381/74 |
| 2007/0259542 | A1* | 11/2007 | Yang et al. .............. 439/70 |
| 2008/0032753 | A1 | 2/2008 | Nho |
| 2010/0075723 | A1 | 3/2010 | Min et al. |

FOREIGN PATENT DOCUMENTS

| CN | 1336659 A | 2/2002 |
| CN | 101686282 A | 3/2010 |
| EP | 1 156 587 A2 | 11/2001 |
| EP | 2 166 737 A1 | 3/2010 |
| JP | 1989-140639 A | 6/1989 |
| JP | 1990-018739 A | 1/1990 |
| JP | 2001-169385 A | 6/2001 |
| JP | 2005-108372 A | 4/2005 |
| JP | 2007-073157 A | 3/2007 |

\* cited by examiner

*Primary Examiner* — Vivian Chin
*Assistant Examiner* — Ammar Hamid
(74) *Attorney, Agent, or Firm* — Jefferson IP Law, LLP

(57) ABSTRACT

An earphone system and method of operating an earphone system are provided. The earphone system includes a mobile device and an earphone. When a 4-pole earphone header of the earphone is inserted into an ear jack interface of the mobile device, the ear jack interface receives at least one input signal from earphone input elements of the earphone through the earphone header. The mobile device identifies the received at least one input signal through the ear jack interface and controls a particular user-function in response to the identified at least one input signal.

14 Claims, 6 Drawing Sheets

EARPHONE SYSTEM FOR MOBILE DEVICE AND METHOD FOR OPERATING THE SAME

PRIORITY

This application claims the benefit under 35 U.S.C. §119(a) of a Korean patent application filed on Apr. 30, 2010 in the Korean Intellectual Property Office and assigned Serial No. 10-2010-0041046, the entire disclosure of which is hereby incorporated by reference.

BACKGROUND OF THE INVENTION

1. Field of the Invention

The present invention relates to a mobile device having an ear jack interface. More particularly, the present invention relates to an earphone system and operation method thereof for identifying various input signals offered from an earphone connected to the ear jack interface and thereby for controlling a particular user-function in response to the identified signal.

2. Description of the Related Art

Normally, a mobile device denotes a type of electronic device that provides mobility and portability. With remarkable growth of related technologies, a great variety of mobile devices, such as a mobile communication device and a Personal Digital Assistant (PDA), are becoming increasingly popular these days. A typical mobile communication device has a module for supporting a mobile communication function and thereby allows voice and data communications with other mobile communication devices through a base station. A typical PDA has a Central Processing Unit (CPU), a memory unit, an Operating System (OS), and various programs and modules that operate based on the OS, and thereby allows various functions to collect, store, write and search information.

Some functions of the mobile device, e.g., a call function, an audio file play function, etc., inherently include a function to output audio signals through a speaker provided on the mobile device. Alternatively, a user of the mobile device may use an earphone to prevent sounds from being heard outside or to hear clearer sounds.

For a connection with an earphone, a conventional mobile device typically includes a 4-pole ear jack interface. However, this 4-pole ear jack interface only supports an audio signal output through right and left earphone speakers and an audio signal input through an earphone microphone. Additionally, the 4-pole ear jack interface merely recognizes the insertion of an earphone and then only performs audio input and output. Therefore, the utilization of such a conventional ear jack interface is limited. Even if any external device can be connected to the 4-pole ear jack interface, this may unfavorably cause great power consumption since a conventional mobile device should always monitor a connection of an external device by continuously detecting the value of an Analog Digital Converter (ADC) received through the ear jack interface.

SUMMARY OF THE INVENTION

Aspects of the present invention are to address at least the above-mentioned problems and/or disadvantages and to provide at least the advantages described below. Accordingly, an aspect of the present invention is to provide an earphone system, a mobile device for supporting the earphone system, and an operation method for the earphone system, allowing various input elements to be connected to an ear jack interface of the mobile device with reduced power consumption.

According to an aspect of the present invention, an earphone system is provided. The system includes an earphone including a 4-pole earphone header and an earphone input unit, the earphone header having an earphone microphone terminal, and the earphone input unit being configured to create at least one input signal for the control of a user-function of a mobile device and to send the at least one input signal to the mobile device through the earphone microphone terminal, and the mobile device including an ear jack interface including a microphone electrode pin, the mobile device being configured to receive the at least one input signal through the microphone electrode pin when the ear jack interface is connected to the earphone header, to identify the received at least one input signal, and to control the user-function corresponding to the at least one identified input signal.

According to another aspect of the present invention, a mobile device is provided. The device includes an ear jack interface for reception of a 4-pole earphone header of an earphone, the ear jack interface including a microphone electrode pin for connection to an earphone microphone terminal of the earphone header, and a control unit configured to receive at least one input signal through the microphone electrode pin, the input signal being created by earphone input elements of the earphone, to identify the received input signal, and to control a particular user-function corresponding to the identified input signal.

According to still another aspect of the present invention, a method for operating an earphone system is provided. The method includes determining whether a 4-pole earphone header of an earphone is inserted into an ear jack interface, receiving at least one input signal from earphone input elements of the earphone through the earphone header, identifying the received at least one input signal through the ear jack interface, and controlling a particular user-function in response to the identified at least one input signal.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
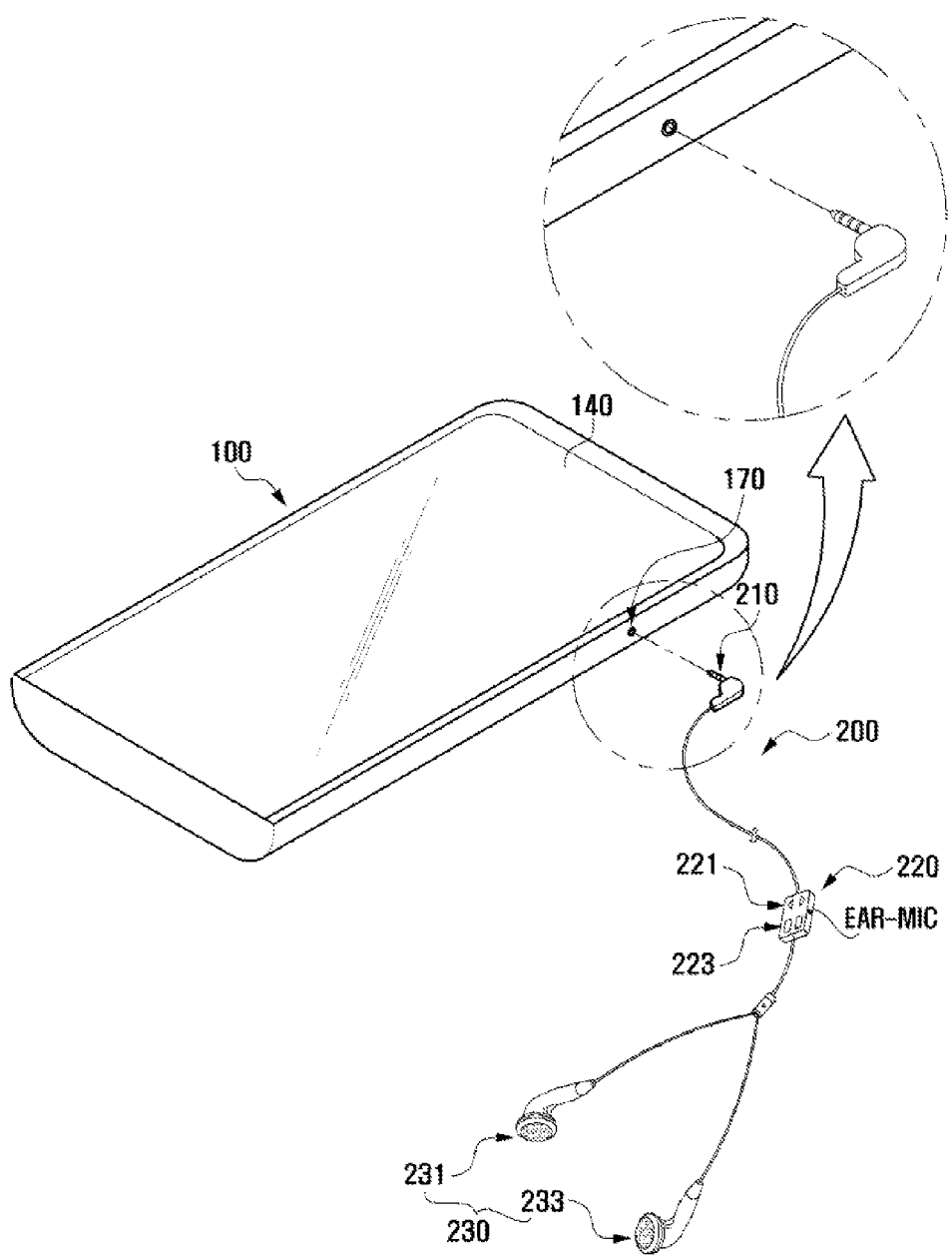
FIG. 1 is a perspective view illustrating an earphone system in accordance with an exemplary embodiment of the present invention.

FIG. 1 is a perspective view illustrating an earphone system in accordance with an exemplary embodiment of the present invention.

Referring to FIG. 1, the earphone system is composed of a mobile device 100 and an earphone 200. Although the following disclosure is based on the earphone 200 connected to an ear jack interface of the mobile device 100, this is exemplary only and not to be considered as a limitation of the present invention. Instead of the earphone 200, any other equivalents, such as an external speaker, can be connected to the ear jack interface.

The mobile device 100 includes a display unit 140 and an ear jack interface 170 and may transmit or receive audio signals, generated during a content playback or a voice call, to or from the earphone 200 through the ear jack interface 170. While connected to the earphone 200, the mobile device 100 may identify signals created by and received from various input elements, such as volume up/down keys and call/stop keys, provided in the earphone 200. Also, the mobile device 100 may control a particular user-function in response to the identified signal. The mobile device 100 may recognize the connection of the earphone 200 from an interrupt created when a header of the earphone 200 is inserted into the ear jack interface 170, and may support particular functions related to the earphone 200. Each individual element of the mobile device 100 will be described in more detail with reference to FIG. 2 below.

The earphone 200 is a device that is connected to the ear jack interface 170 of the mobile device 100. The earphone 200 receives audio signals from the mobile device 100 and converts the received audio signals into sounds. The earphone 200 of a 4-pole type may have an earphone header 210 that is inserted into the ear jack interface 170, an earphone input unit 220 that has an earphone microphone (EAR-MIC), volume up/down keys 221, call/stop keys 223, and the like, and an earphone speaker 230 that may have left and right earphone speakers 231 and 233. The earphone 200 acquires sounds and converts them into audio signals through the earphone microphone (EAR-MIC) and delivers the audio signals to the mobile device 100 through the earphone header 210. In the earphone 200, each element of the earphone input unit 220 may be activated and form a specific path according to a user's manipulation. Namely, each activated element of the earphone 200 may establish a path having a specific resistance value. Also, depending on a voltage value that is varied according to differences in resistance values in each path, the mobile device 100 may determine which element is activated in the earphone 200. Related descriptions will be given later with reference to FIG. 3.

As discussed hereinbefore, the earphone system supports functions of the earphone 200 based on an interrupt created when the earphone 200 is connected to the ear jack interface 170. Furthermore, the earphone system identifies various signals created by and received from various input elements, such as volume up/down keys and call/stop keys, provided in the earphone 200, and controls a particular user-function in response to the identified signal. Therefore, a user can easily adjust an audio volume, make a call, stop a call, etc., by manipulating the 4-pole earphone 200 without directly handing the mobile device 100.

Figure 2:
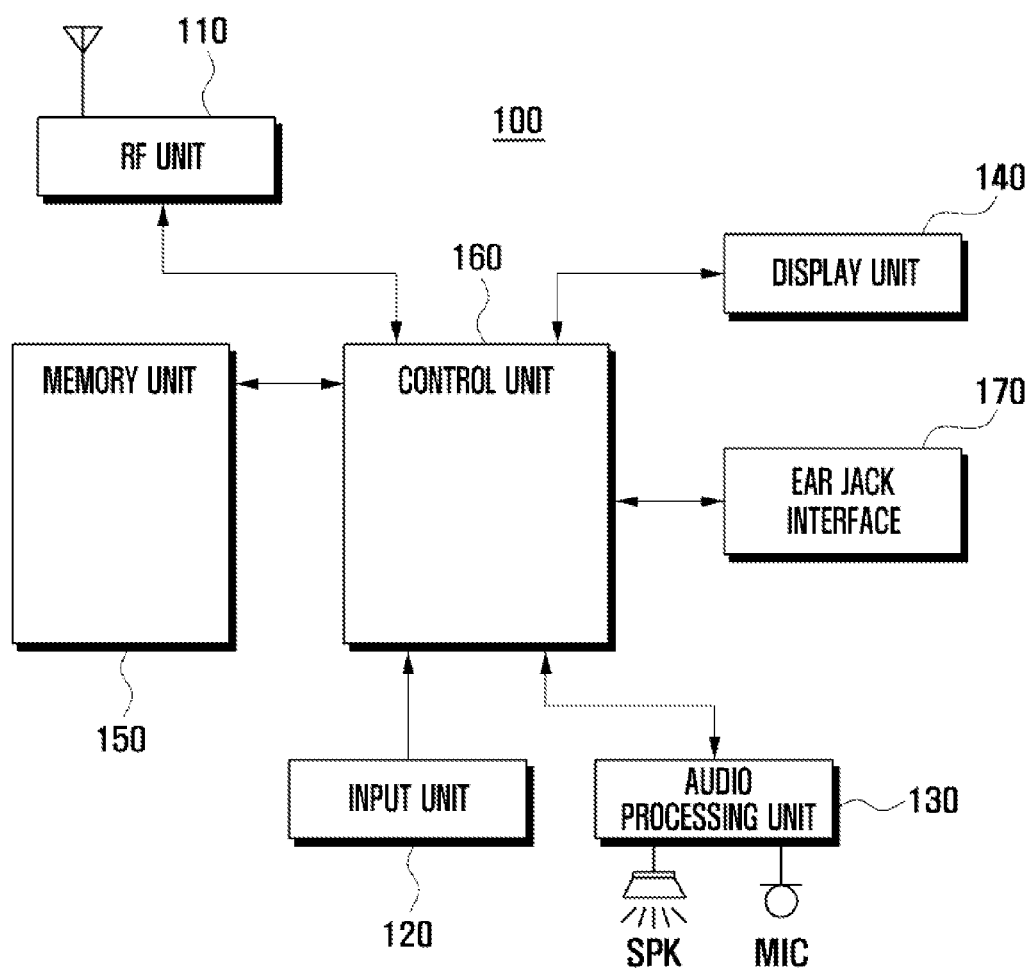
FIG. 2 is a block diagram illustrating a configuration of a mobile device in accordance with an exemplary embodiment of the present invention.

FIG. 2 is a block diagram illustrating a configuration of a mobile device in accordance with an exemplary embodiment of the present invention.

Referring to FIG. 2, the mobile device 100 of this invention may include a Radio Frequency (RF) unit 110, an input unit 120, an audio processing unit 130, a display unit 140, a memory unit 150, an ear jack interface 170, and a control unit 160.

The mobile device 100 having the above-specified elements is structured to create an interrupt when the earphone 200 is connected to the ear jack interface 170. When such an interrupt occurs, the mobile device 100 can shift an audio path to the earphone 200. Also, if any interrupt is caused by a voltage drop under a given value in the ear jack interface 170, the mobile device 100 can detect the magnitude of a voltage drop and thereby identify the type of an input signal created by and received from the earphone 200. The mobile device 100 can perform a particular user-function in response to the identified input signal of the earphone 200. Each individual element of the mobile device 100 will be described below in more detail.

The RF unit 110 is a kind of communication module for supporting a mobile communication service of the mobile device 100. The RF unit 110 may employ a Global System for Mobile communication (GSM) module, a Code Division Multiple Access (CDMA) module, or the like according to the type of mobile communication service and, based on such a module, establishes a communication channel with a mobile communication system. For this, the RF unit 110 may include an RF transmitter that up-converts the frequency of an outgoing signal and amplifies the signal, an RF receiver that amplifies with low-noise an incoming signal and down-converts the frequency of the signal, and the like. The RF unit 110 may be essential or not according to the type of mobile device 100. Namely, if the mobile device 100 supports a mobile communication function based on a base station, the RF unit 110 is essential. However, in case of a monitor, a music player, etc. that requires no mobile communication function, the RF unit 110 may be omitted according to the designer's or manufacturer's intention.

More particularly, the RF unit 110 of this invention establishes a call channel with any other device in response to a user's manipulation and sends or receives audio signals to or from the other device. At this time, audio signals received by the RF unit 110 may be delivered to the earphone speaker 230 of the earphone 200 through the ear jack interface 170.

The input unit 120 includes a plurality of input keys and function keys to receive a user's input action and to set various functions. The function keys may have navigation keys, side keys, shortcut keys, and any other special keys defined to perform particular functions. Additionally, the input unit 120 receives a user's key manipulation for controlling the mobile device 100, creates a corresponding input signal, and delivers it to the control unit 160.

More particularly, the input unit 120 may create various input signals for controlling user-functions of the mobile device 100 and send them to the control unit 160. For instance, depending on a user's manipulation, the input unit 120 may create an input signal for entering or selecting a desired phone number, an input signal for trying to connect a call based on the desired phone number, an input signal for selecting and playing a desired file stored in the memory unit 150, or the like, and deliver it to the control unit 160.

The audio processing unit 130 may include a speaker (SPK) for outputting audio signals delivered from the control unit 160, and a microphone (MIC) for collecting audio signals while a particular application is running. When the RF unit 110 is activated, the audio processing unit 130 may output audio signals received through the RF unit 110 or audio signals of selected content to the speaker (SPK). More particularly, before the earphone 200 is connected to the ear jack interface 170, the audio processing unit 130 forms audio output and input paths based on the speaker (SPK) and the microphone (MIC). However, if the earphone 200 is connected to the ear jack interface 170, the audio processing unit 130 removes the above paths based on the speaker (SPK) and the microphone (MIC) and forms new audio output and input paths based on the earphone-microphone (EAR-MIC) and the earphone speaker 230 in the earphone 200. Therefore, audio signals of the mobile device 100 may be output through the ear jack interface 170 of the mobile device 100 and the earphone speaker 230 of the earphone 200, and audio signals collected by the earphone microphone (EAR-MIC) may be input to the control unit 160 through the ear jack interface 170 and the audio processing unit 130.

The display unit 140 represents information, including various menus of the mobile device 100, input by a user or offered to a user. Namely, the display unit 140 may visually offer a variety of screen views in connection with the use of the mobile device 100, such as an idle screen, a menu screen, a message writing screen, a call screen, and the like.

More particularly, the display unit 140 may enter into various states according to the connection of the ear jack interface 170. That is, when the earphone 200 is connected to the ear jack interface 170 during a call, the display unit 140 may be automatically turned off to minimize power consumption. If any input signal for instructing a supply of power is input, the display unit 140 may be turned on to again display the screen that was displayed just before being turned off. Additionally, when the earphone 200 is connected to the ear jack interface 170, the display unit 140 may output a given message or any other equivalents to announce the connection to a user. This function may be disabled at a user's request. Furthermore, if any input signal is delivered from the earphone 200, the display unit 140 may output a related screen. For instance, when receiving an input signal from the volume up/down keys or call/stop keys of the earphone 200, the display unit 140 may display a given image related to a selected input key to offer a feedback to a user. This function may also be disabled at a user's request.

Meanwhile, the display unit 140 may be formed of a Liquid Crystal Display (LCD), Organic Light Emitting Diodes (OLEDs), or any other equivalent. In case of being fabricated in the form of a touch screen, the display unit 140 may act as an input unit as well. In this case, the touch screen may be composed of a display panel and touch sensors disposed thereon. Also, the mobile device 100 in this case may offer various menu screens available and suitable for the touch screen.

The memory unit 150 stores a variety of applications required for functions related to an exemplary embodiment of this invention or required for execution or playback of various types of files. If the mobile device 100 employs a touch screen, the memory unit 150 may store a key map, a menu map, etc. required for the operation of the touch screen. Here, the key map may have various well known types such as a keyboard map, a 3*4 key map, a QWERTY key map, or a special control key map suitable for the operation of a currently activated application. Also, the menu map may be a special menu map suitable for the operation of a currently activated application or a normal menu map having menu items offered by the mobile device. The memory unit 150 may consist of a program region and a data region.

The program region may store an Operating System (OS) for booting and operating the mobile device 100, and applications required for performing various functions or required for executing or playing various files, such as a call application, a web browser for surfing on the Internet, a Moving Picture Experts Group (MPEG) MPEG-1 or MPEG-2 Audio Layer III (MP3) application for playing digital sounds, an image viewer application for showing image files, a video player application, and the like. More particularly, the program region may store an earphone support application for supporting the function of the earphone 200.

The earphone support application is a specialized program that is activated when the earphone 200 is connected to the ear jack interface 170, controls the shift of an audio path toward the earphone 200, identifies an input signal received from the earphone 200, and controls a particular user-function based on the identified input signal. For the above, the earphone support application may be loaded in the control unit 160 and may contain a routine for determining whether the earphone 200 is connected to the ear jack interface 170, a routine for controlling the shift of audio output and input paths, a routine for identifying an input signal received from the earphone 200, and a routine for controlling a particular user-function in response to the identified input signal. The user-function control routine may have a subroutine for controlling specific options of a currently activated user-function and a subroutine for activating a selected user-function or inactivating the activated user-function.

The data region stores data created or received while the mobile device 100 is used, and also may store various contents depending upon the type of the mobile device. In addition, if the display unit 140 is formed of a touch screen, the data region may store user's inputs received from the touch screen. More particularly, the data region may store an input signal table used for controlling user-functions based on the connection of the earphone 200. The input signal table may define a mapping relation between types of input signals received from the earphone 200 and commands for executing user-functions. For instance, the input signal table may contain information about a command to increase a volume of a currently activated user-function in response to an input signal of the volume up key of the earphone 200. Such an input signal substantially corresponds to a specific voltage value, so the input signal table may be used for the creation of commands according to various voltage values.

The ear jack interface 170 is provided on a side of the mobile device 100 in a form that allows the earphone header 210 to be inserted and then fixed. The ear jack interface 170 may have several pins such that various types of earphones can be used. A related description will be given later with reference to FIG. 3.

The control unit 160 controls a power supplying and initializing process for each element of the mobile device 100. After initializing, the control unit 160 may perform a control for a particular user-function selected in response to the connection of the earphone 200. More specifically, the control unit 160 may employ the above-discussed earphone support application and determine whether the earphone 200 is connected to the ear jack interface 170. For this, the mobile device 100 may equip the ear jack interface 170 with terminals or electrode pins for keeping a reference voltage. The mobile device 100 may recognize the connection of the earphone 200 by detecting a drop of the reference voltage caused by the connection of the earphone 200. Additionally, the control unit 160 may establish and control a signal path of the earphone 200 that is in contact with various electrode pins of the ear jack interface 170. A related description will be given hereinafter with reference to FIG. 3.

Figure 3:
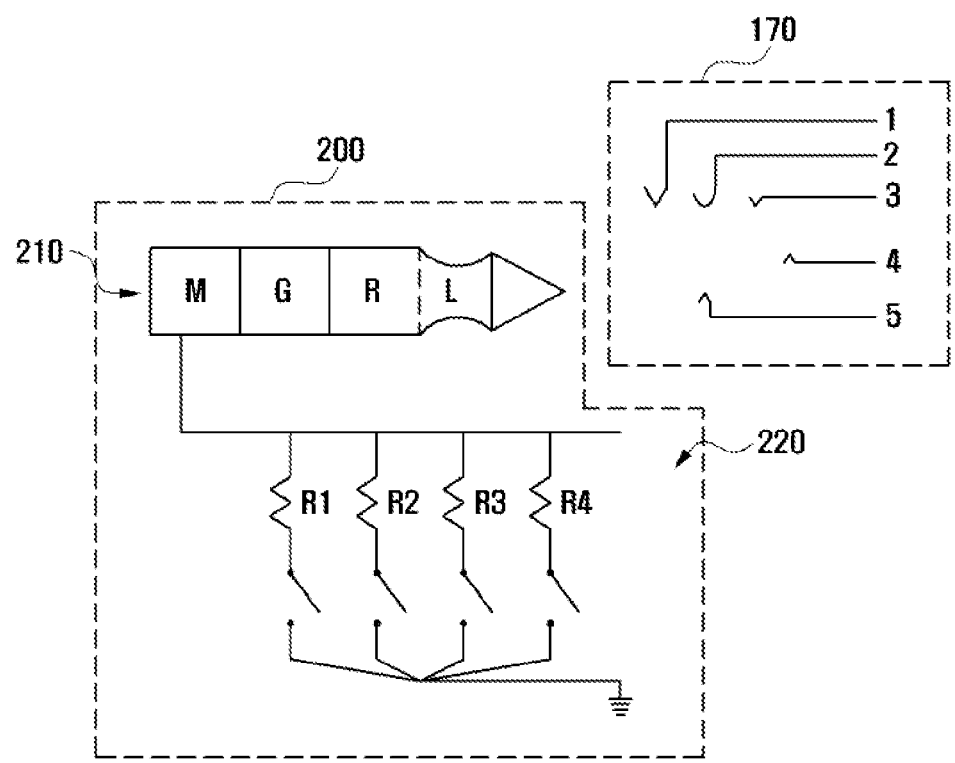
FIG. 3 is a schematic view illustrating an ear jack interface and an earphone in the earphone system in accordance with an exemplary embodiment of the present invention.

FIG. 3 is a schematic view illustrating an ear jack interface and an earphone in an earphone system in accordance with an exemplary embodiment of the present invention.

Referring to FIG. 3, the ear jack interface 170 may have five electrode pins denoted respectively by reference numbers 1, 2, 3, 4 and 5. Specifically, the first electrode pin 1 is a microphone electrode pin to be connected to an earphone microphone terminal M of the earphone header 210. The second electrode pin 2 is a ground electrode pin to be connected to a ground terminal G of the earphone header 210. The third electrode pin 3 is a right speaker electrode pin to be connected to a right earphone speaker terminal R of the earphone header 210. The fourth electrode pin 4 is a left speaker electrode pin to be connected to a left earphone speaker terminal L of the earphone header 210. The fifth electrode pin 5 is an optional electrode pin to be connected to the ground terminal G of the earphone header 210. More particularly, the fifth electrode pin 5 may be used to generate an interrupt caused by the connection of the earphone 200. Namely, when the fifth electrode pin 5 is grounded through the connection of the earphone 200 under conditions where a given reference voltage is applied to the fifth electrode pin 5, the control unit 160 may determine that the earphone 200 is connected by recognizing a change of the reference voltage as an interrupt.

The third and fourth electrode pins 3 and 4 may be connected to the same terminal of the earphone header 210 in some types of earphones 200. More specifically, if the earphone 200 is a stereo type, the third and fourth electrode pins 3 and 4 are connected respectively to the right and left earphone speaker terminals R and L which are separately formed. However, if the earphone 200 is a monaural type, the third and fourth electrode pins 3 and 4 may be connected to a single speaker terminal which is formed without distinguishing right and left speakers from each other. Nevertheless, since this invention is to identify input signals received through the earphone microphone terminal M, this invention may be applied to any type of earphone 200, namely, regardless of mono or stereo. In this disclosure, a stereo type of earphone 200 is exemplarily used.

The earphone header 210 may have four terminals interconnected to the respective elements of the earphone 200. Specifically, the earphone header 210 may have the earphone microphone terminal M, the ground terminal G, the right earphone speaker terminal R, and the left earphone speaker terminal L. The right earphone speaker terminal R is interconnected to the right earphone speaker 231, and the left earphone speaker terminal L is interconnected to the left earphone speaker 233. The earphone-microphone terminal M is interconnected to each of the earphone-microphone (EAR-MIC), the volume up/down keys 221, and the call/stop keys 223 contained in the earphone input unit 220. The volume up/down keys 221 include a volume up key and a volume down key, and the call/stop keys 223 include a call key and a call stop key. In FIG. 3, each key is represented to be a resistance. Namely, the first resistance R1 indicates the volume up key, and the second resistance R2 indicates the volume down key. Similarly, the third resistance R3 indicates the call key, and the fourth resistance R4 indicates the call stop key. More particularly, the resistance of each key may be different in value from the others. As discussed above, when the earphone header 210 is inserted into the ear jack interface 170, it comes in contact with the respective electrode pins of the ear jack interface 170.

Figure 4:
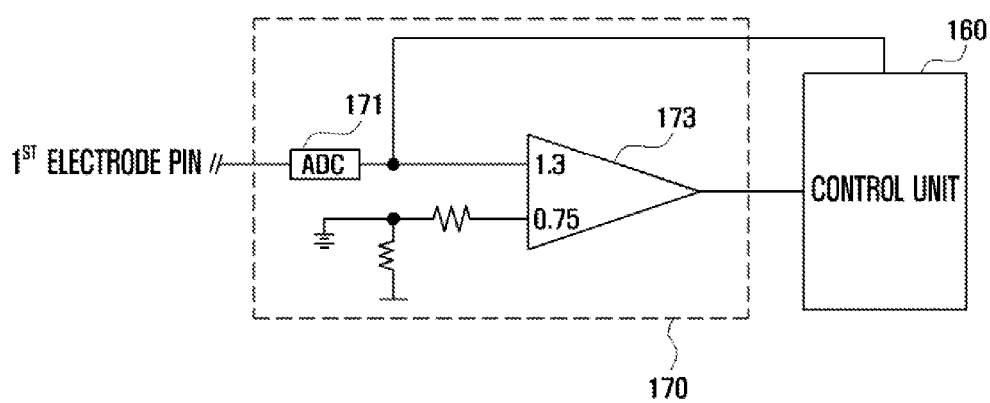
FIG. 4 is a schematic view illustrating signal identification in an ear jack interface in accordance with an exemplary embodiment of the present invention.

FIG. 4 is a schematic view illustrating signal identification in an ear jack interface in accordance with an exemplary embodiment of the present invention.

Referring to FIG. 4, the ear jack interface 170 may have an Analog Digital Converter (ADC) 171 and a comparator 173. The ADC 171 is connected between the first electrode pin 1 of the ear jack interface 170 and the comparator 173. The comparator 173 compares a voltage delivered through the first electrode pin 1 with the reference voltage such that a selected user-function may be controlled according to comparison results. For instance, if only the earphone-microphone (EAR-MIC) is connected to the first electrode pin 1, an input value of the comparator 173 becomes about 1.3V. In this case, an audio signal input through the earphone-microphone (EAR-MIC) may be offered to the control unit 160 along a signal path.

Meanwhile, when any selected key of the earphone input unit 220 is activated, a voltage applied to the first electrode pin 1 through the earphone-microphone terminal M may be dropped under 1.3V due to the resistance of the selected key. Here, the magnitude of a voltage drop may be adjusted through variations in resistance. Also, as discussed above, the respective keys of the earphone input unit 220 may have different resistance values. Such resistance values may be adjusted to cause a voltage drop under the reference voltage (e.g., 0.75V) of the comparator 173. When any selected key is activated, a voltage drop occurs and the comparator 173 may offer comparison results depending on such a voltage drop to the control unit 160. Therefore, even though the control unit 160 does not continuously monitor the comparator 173, the control unit 160 can recognize a selected key by detecting the magnitude of a voltage drop output from the comparator 173. The reference voltage of the comparator 173 may be varied according to a designer's intention. Also, the resistance values of the respective keys may be varied according to a designer's intention.

As discussed hereinbefore, the earphone system according to an exemplary embodiment of the present invention and the mobile device using the earphone system may identify various signals of the earphone input unit 220 in the earphone 200 when the 4-pole earphone 200 is connected, and may control a particular user-function in response to the identified signal. Although the earphone input unit 220 is described as having the volume up/down keys and the call/stop keys, this is exemplary only and not to be considered as a limitation of the present invention. Alternatively or additionally, the earphone input unit 220 may have any other various keys such as power turn-off key, a search key, etc.

Now, an exemplary method for operating an earphone system will be described in more detail with reference to FIGS. 5 and 6.

Figure 5:
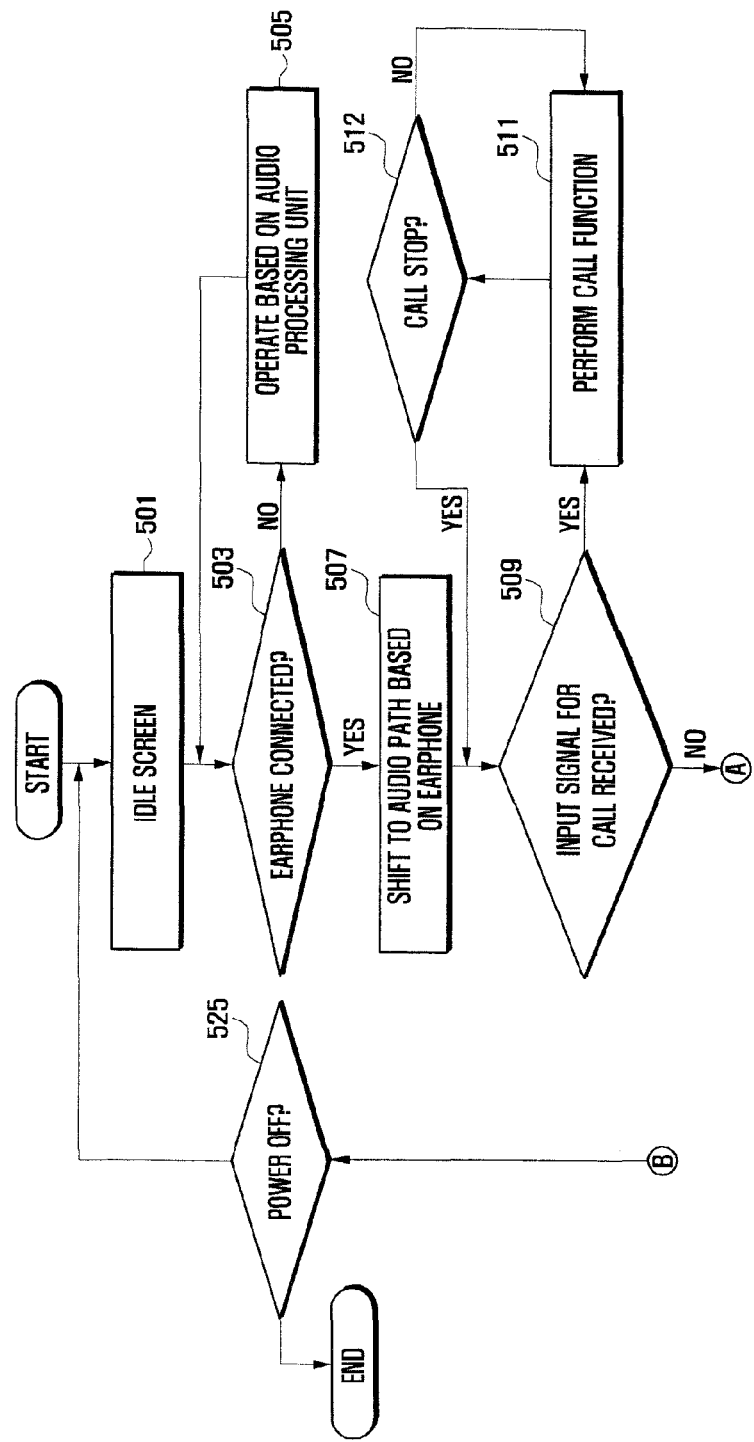
FIGS. 5 and 6 are flow diagrams illustrating a method for operating an ear phone system in accordance with an exemplary embodiment of the present invention.
Figure 6:
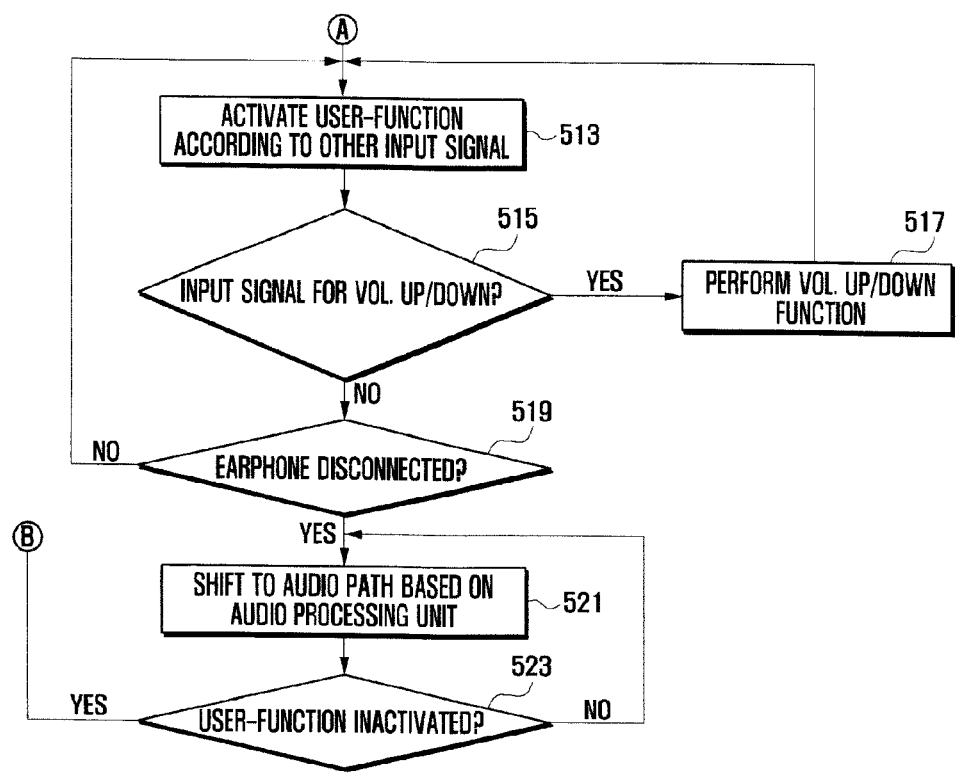

FIGS. 5 and 6 are flow diagrams illustrating a method for operating an ear phone system in accordance with an exemplary embodiment of the present invention. The following discussion will be focused on a process flow in the mobile device 100.

Referring to FIGS. 5 and 6, when power is supplied to the mobile device 100, the control unit 160 performs a booting process and initializes the respective elements of the mobile device 100. Then, based on predefined schedule information, the control unit 160 outputs an idle screen on the display unit 140 in step 501. If the schedule information contains instructions to activate a particular user-function, the control unit 160 may activate the user-function in this step according to the schedule information.

In step 503, the control unit 160 may determine whether the earphone 200 is connected to the ear jack interface 170 of the mobile device 100, namely whether the earphone header 210 is inserted into the ear jack interface 170. If it is determined in step 503 that there is no connection of the earphone 200, the control unit 160 may activate a selected user-function according to an input signal of the input unit 120 and then, based on the audio processing unit 130, control a processing of audio signals in step 505.

On the other hand, if it is determined in step 503 that the earphone 200 is connected to the ear jack interface 170, the control unit 160 may shift current audio output and input paths to new paths based on the earphone 200 in step 507. Thereafter, the control unit 160 may determine whether an input signal for making a call is received from the earphone 200 in step 509. If so, the control unit 160 may try to make a call with the last phone number in a call history and also support a related user-function in step 511. In step 512, the control unit 160 may determine whether an input signal for stopping a call is received from the earphone 200. If so, the control unit 160 may return to step 509.

If it is determined in step 509 that there is no input signal for making a call, the control unit 160 may activate a selected user-function in response to any other input signal in step 513.

In step 515, the control unit 160 may determine whether an input signal corresponding to the volume up/down keys is received from the earphone 200. If so, the control unit 160 may increase or decrease a sound volume of a currently activated user-function in step 517. Then the control unit 160 may return to step 513.

On the other hand, if it is determined that there is no input signal in step 515, the control unit 160 may further determine whether the earphone 200 is disconnected from the ear jack interface 170, namely whether the earphone header 210 is withdrawn from the ear jack interface 170 in step 519. If it is determined in step 519 that there is no disconnection of the earphone 200, the control unit 160 may return to step 513.

If it is determined in step 519 that there is a disconnection of the earphone 200, the control unit 160 may shift again the audio output and input paths based on the earphone 200 to the original paths based on the audio processing unit 130 while keeping a currently activated user-function in step 521. In step 523, the control unit 160 may determine whether an input signal for inactivating the current user-function is received. If it is determined in step 523 that there is no inactivating signal, the control unit 160 may return to step 521. Alternatively, if it is determined in step 523 that there is an inactivating signal for the user-function, the control unit 160 may further determine whether an input signal for turning off the mobile device is received in step 525. If there is no turn-off signal, the control unit 160 may return to the initial step 501.

The control unit 160 may automatically lock the input unit 120 when the earphone 200 is connected. Additionally, when a call request signal is received from the external entity, the control unit 160 may deliver a related signal to the earphone 200. Also, when a call acceptance signal is received from the earphone 200, the control unit 160 may perform a function to make a call and then form audio paths based on the earphone 200.

As discussed above, an interrupt occurs whenever the mobile device 100 receives any input signal from the earphone 200. Since the control unit 160 can recognize the creation of a specific input signal from the occurrence of an interrupt, the mobile device 100 does not require a continuous monitoring for determining the creation of input signals by the earphone 200. Therefore, unnecessary power consumption is reduced.

According to the above-discussed method for operating the earphone system, when the earphone 200 is connected to the ear jack interface 170, the mobile device 100 can activate or inactivate a particular user-function or control options of the activated user-function in response to an input signal of the earphone 200.

The above-discussed mobile device 100 may essentially or selectively include any other elements. For instance, the mobile device 100 may further include a short range communication module, a digital camera module, a wired or wireless data transmission interface, an Internet access module, a digital broadcast receiving module, and so forth. According to a digital convergence tendency, such elements may be varied, modified and improved in various ways, and any other elements equivalent to the above elements may be additionally or alternatively equipped in the mobile device 100. Meanwhile, as will be understood by those skilled in the art, some of the above-mentioned elements in the mobile device 100 may be omitted or replaced with another.

Additionally, the mobile device 100 of this invention may include any type of electronic devices that has the ear jack interface 170. For instance, the mobile device 100 may include communication devices, multimedia players and their application equipment, especially including many mobile communication terminals based on various communication protocols, a Portable Multimedia Player (PMP), a digital broadcasting player, a Personal Digital Assistant (PDA), a music player (e.g., an MP3 player), a portable game console, a smart phone, a notebook, a handheld personal computer, etc.

While this invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An earphone system comprising:
    an earphone including a 4-pole earphone header and an earphone input unit, the earphone header having an earphone microphone terminal, and the earphone input unit being configured to create at least one input signal for the control of a user-function of a mobile device and to send the at least one input signal to the mobile device through the earphone microphone terminal; and
    the mobile device including an ear jack interface including a microphone electrode pin, the mobile device being configured to receive the at least one input signal through the microphone electrode pin when the ear jack interface is connected to the earphone header, to control a display unit to turn off upon connecting the ear jack interface with the earphone header during a call, to identify the received at least one input signal, and to control the user-function based on the identified at least one input signal, wherein the ear jack interface further comprises:
a ground electrode pin connected to a ground terminal of the earphone header;
a speaker electrode pin connected to right and left earphone speaker terminals of the earphone header; and
an electrode pin to which a reference voltage is applied and which is electrically connected to the ground electrode pin by inserting of the earphone header, the mobile device being configured to detect the inserting of the earphone header by recognizing a corresponding change in the voltage on the electrode pin to which the reference voltage is applied as an interrupt when the earphone header is inserted.

2. The earphone system of claim 1, wherein the earphone input unit comprises an earphone microphone for collecting sounds and at least one of:
volume up/down keys for signaling the mobile device to increase or decrease a volume of an audio signal delivered from the mobile device to the earphone; and
call/stop keys for signaling the mobile device to make or end a call.

3. The earphone system of claim 1, wherein the ear jack interface further comprises:
a ground electrode pin connected to a ground terminal of the earphone header;
a right speaker electrode pin connected to a right earphone speaker terminal of the earphone header; and
a left speaker electrode pin connected to a left earphone speaker terminal of the earphone header.

4. The earphone system of claim 1, wherein the earphone input unit creates the at least one input signal by changing a resistance of a signal path to which the earphone microphone terminal is connected.

5. A mobile device comprising:
an ear jack interface for reception of a 4-pole earphone header of an earphone, the ear jack interface including a microphone electrode pin for connection to an earphone microphone terminal of the earphone header and an electrode pin to which a reference voltage is applied and which is connected to ground by inserting the earphone header; and
a control unit configured to detect the inserting of the earphone header by a corresponding change in the voltage on the electrode pin to which the reference voltage is applied when the earphone header is inserted, to control a display unit to turn off upon detecting insertion of the earphone header during a call, to receive at least one input signal through the microphone electrode pin, the input signal being created by earphone input elements of the earphone, to identify the received input signal, and to control a particular user-function based on the identified input signal.

6. The mobile device of claim 5, wherein the ear jack interface further includes:

an Analog Digital Converter (ADC) connected to the microphone electrode pin; and
a comparator for detecting a voltage drop of the ADC under a given value.

7. The mobile device of claim 6, wherein the control unit is further configured to identify types of the input signals created by the earphone input elements according to a voltage value output from the comparator.

8. The mobile device of claim 5, further comprising:
a memory unit for storing an input signal table that defines a mapping relation between types of the input signals created by the earphone input elements and commands for executing user-functions.

9. The mobile device of claim 5, wherein the control unit is further configured to identify the input signal received from the earphone as being received from at least one of volume up/down keys and call/stop keys and, based on the identified signal, to perform a corresponding one of a volume up/down function and a call/stop function.

10. A method for operating an earphone system, the method comprising:
determining whether a 4-pole earphone header of an earphone is inserted into an ear jack interface by detecting a voltage change on an electrode pin to which a reference voltage is applied when the earphone header is inserted, and controlling a display unit to turn off upon inserting the earphone header during a call;
receiving at least one input signal from earphone input elements of the earphone;
identifying the received at least one input signal through the ear jack interface; and
controlling a user-function based on the identified at least one input signal.

11. The method of claim 10, wherein the identifying of the at least one input signal includes:
comparing a given reference voltage with a voltage drop output from a microphone electrode pin provided in the ear jack interface; and
identifying the input signal according to comparison results.

12. The method of claim 10, wherein the controlling of the user-function includes:
receiving the identified at least one input signal; and
retrieving information about the particular user-function corresponding to the identified at least one input signal from an input signal table that defines a mapping relation between types of the input signals and commands for executing the user-functions.

13. The method of claim 10, wherein the identified at least one input signal comprises one of a volume up signal, a volume down signal, a call signal, and a call stop signal.

14. The method of claim 10, wherein the particular user-function comprises one of a function to increase or decrease a sound volume and a function to make or end a call.

* * * * *